United States Patent
Hedberg et al.

[11] Patent Number: 6,076,999
[45] Date of Patent: Jun. 20, 2000

[54] BORING BAR

[75] Inventors: Anna Hedberg; Eric Tjernstrom, both of Gävle, Sweden

[73] Assignee: Sandvik Aktiebolag, Sandviken, Sweden

[21] Appl. No.: 09/214,516

[22] PCT Filed: Jul. 7, 1997

[86] PCT No.: PCT/SE97/01232

§ 371 Date: May 14, 1999

§ 102(e) Date: May 14, 1999

[87] PCT Pub. No.: WO98/01250

PCT Pub. Date: Jan. 15, 1998

[30] Foreign Application Priority Data

Jul. 8, 1996 [SE] Sweden ................... 9602727

[51] Int. Cl.$^7$ ................... B23B 29/02
[52] U.S. Cl. ................... 407/66; 407/102; 407/118; 407/119; 408/144
[58] Field of Search ................... 82/1.11, 904, 163; 407/32, 119, 66, 102, 118; 408/143, 144, 145; 409/141

[56] References Cited

U.S. PATENT DOCUMENTS

| | | |
|---|---|---|
| 3,751,176 | 8/1973 | Von Hollen ................... 408/144 |
| 3,838,936 | 10/1974 | Andreassen et al. . |
| 5,809,854 | 9/1998 | Thielen et al. ................... 408/144 X |

FOREIGN PATENT DOCUMENTS

| | | |
|---|---|---|
| 0 143 207 | 6/1985 | European Pat. Off. . |
| 0 391 881 | 10/1990 | European Pat. Off. . |
| 947 659 | 8/1956 | Germany . |
| 1 403 000 | 11/1968 | Germany . |
| 1 552 450 | 1/1970 | Germany . |
| 2 329 234 | 12/1974 | Germany . |
| 3314349 | 10/1984 | Germany ................... 408/144 |
| 0076251 | 4/1986 | Japan ................... 408/143 |
| 61-038804 | 7/1986 | Japan . |
| 001779468 | 12/1992 | U.S.S.R. ................... 408/143 |
| 1 299 750 | 12/1972 | United Kingdom . |

Primary Examiner—Henry W. H. Tsai
Attorney, Agent, or Firm—Burns, Doane, Swecker & Mathis, L.L.P.

[57] ABSTRACT

A boring bar includes a shaft and a head which carries a cutting insert. The head includes a conical protrusion which fits in a correspondingly shaped recess of the shaft and is secured therein by an adhesive joint in order to damp vibrations.

4 Claims, 2 Drawing Sheets

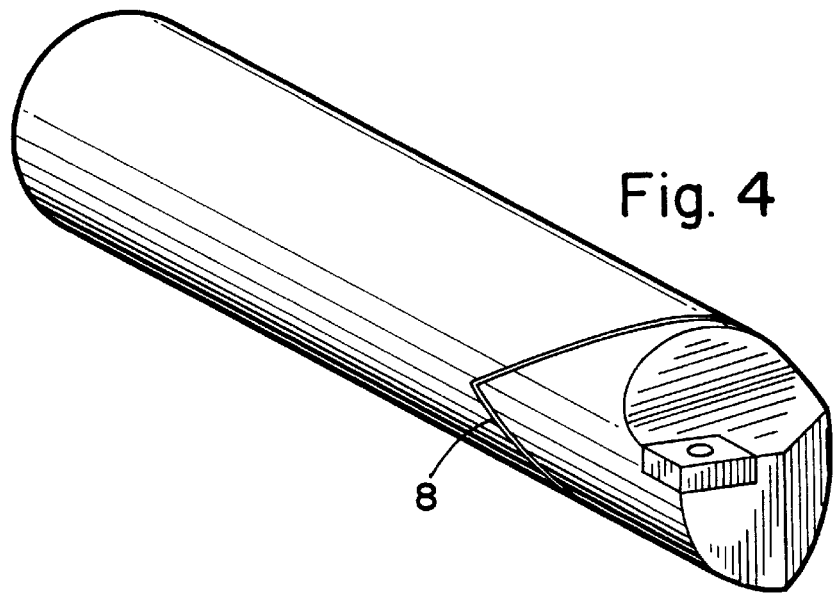
Fig. 4
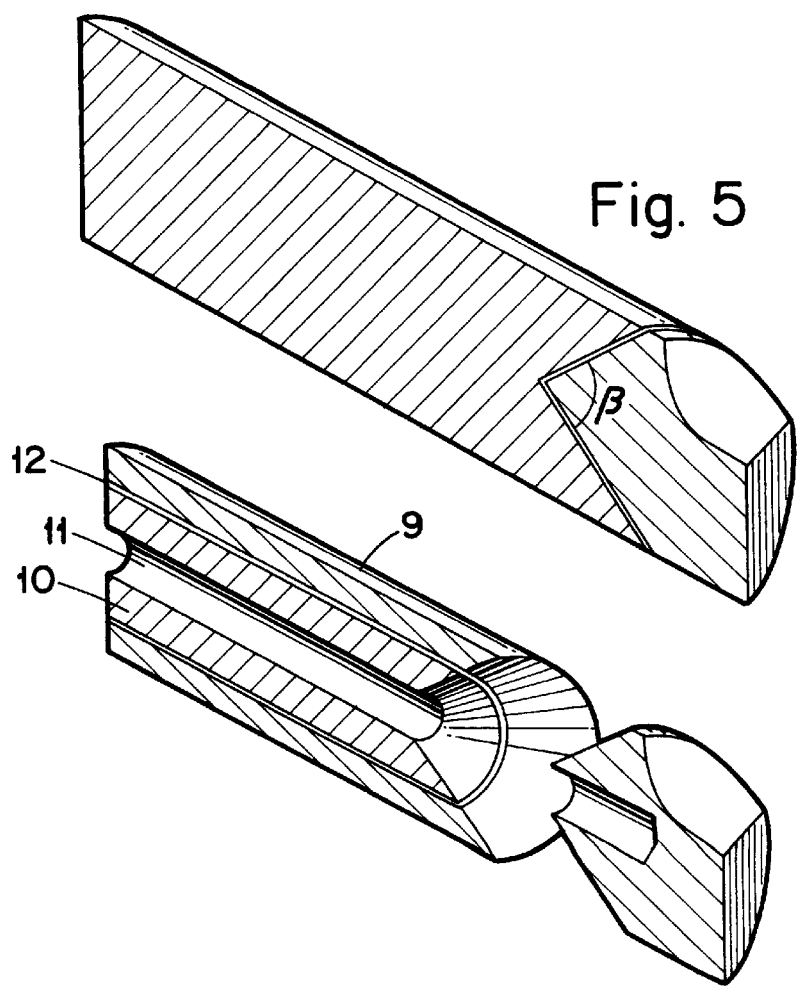
Fig. 5
Fig. 6

BORING BAR

BACKGROUND OF THE INVENTION

The present invention relates to a boring bar, a process for the production of a boring bar, and the use of such a boring bar for the damping of vibrations during internal turning.

Turning operations can be divided into those for external turning and those for inner turning, the latter normally called internal turning. As the names indicate, external turning operations relate to turning on an external rotating surface of a workpiece, while internal turning refers to turning on an inner rotating surface. A special case of external turning is face turning.

During external turning, the overhang of the tool is not influenced by the length of the workpiece since external rotating surfaces usually are exposed and freely accessible. Thus, dimensions of tool holders may be chosen so that they resist the forces or stresses that arise. However, during internal turning the choice of tool is restricted by the appearance of the workpiece, since this turning operation is usually applied in pre-drilled holes or holes in cast, forged or extruded elements. Thus, when turning in a deep hole, a long boring bar with a long overhang is required, which of course increases the risk of deflection and vibrations, which in turn results in a worse surface smoothness and disturbing noise. This problem is accentuated by the fact that internal turning operations are mainly used for applications with high demands on dimension tolerances and surface smoothness.

Thus, at internal turning the depth of the hole will determine the smallest practically possible overhang. For a larger boring bar diameter (D) the stability is increased, but also here the possibilities are restricted by the fact that the space which is offered by the hole diameter of the workpiece must be respected. By the special circumstances that are present for long overhangs (L) and a restricted bar diameter, the stability is described starting off from the relation L/D. The smaller the relation L/D, the better stability is achieved.

The restrictions concerning the stability for internal turning require that special care must be taken for production planning and preparation. With knowledge of how the shearing forces are influenced by tool geometry and selected cutting data, and how different types of boring bars and tool joints influence stability, deflections and vibrations can to some extent be minimized. However, it would be desirable to reduce them further.

In for instance SE-B-385 797 (and U.S. Pat. No. 3,838, 936), a damping arrangement is disclosed for inter alia boring bars, which comprises a damping portion being arranged in an axial boring in the boring bar and being coupled to the same via one or several springing elements in the form of, e.g., sheets or circumferential rings of a resilient material such as rubber. Possibly, a fluidum may be introduced into the space between the damping portion and the boring, in order to contribute to the damping effect. Although this construction certainly reduces vibrations, it is complicated and space-demanding.

Thus, a primary object of the present invention is to provide a boring bar with a reduced tendency for vibrations.

A second object of the present invention is to make possible longer overhangs without thereby increasing the tendency for vibrations.

Still another object of the present invention is to minimize the risk of vibrations in boring bars with the simplest possible construction.

SUMMARY OF THE INVENTION

These and further objects have been attained in a surprising way by connecting a bar head to a shaft portion by an adhesive joint.

ADDITIONAL PRIOR ART

It is known per se to use an adhesive for some other applications for cutting machining. Thus, DE-A-1 552 450 discloses how an adhesive may be used for the fastening of cutting inserts of a highly alloyed steel or high speed steel in a holder, and also how the operative top portion of a reamer may be adhered to a shaft. However, these tools are not at all constructed for vibration damping purposes, but only for simplifying the replacement of operative cutting parts.

Further, boring bars divided into two parts are previously known, with a rear shaft portion and a front bar head, which is then screwed onto the shaft portion. Such a screw joint is rigid and does not allow any vibration damping effects at all.

BRIEF DESCRIPTION OF THE DRAWINGS

For illustrative but non-limiting purposes, the invention will now be further described under reference to the appended drawings. These are herewith briefly presented:

FIG. 4 shows another embodiment of the boring bar according to the invention, in perspective obliquely from above.

FIG. 5 shows a central axial cross-section of the boring bar according to FIG. 4.

FIG. 6 shows another embodiment of the boring bar according to the invention, in a projection obliquely from above with two parts thereof being separated from each other.

DETAILED DESCRIPTION OF THE PREFERRED EMBODIMENT OF THE INVENTION

Figure 1:
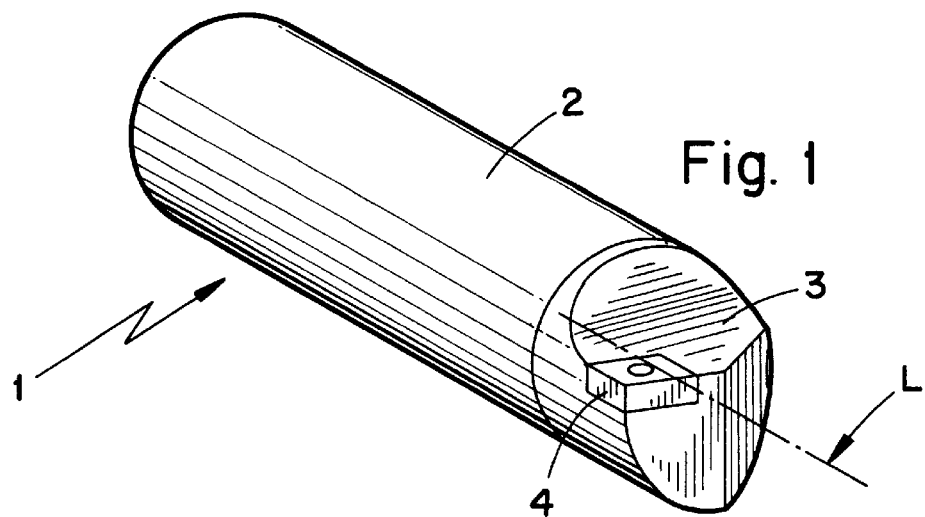
FIG. 1 shows a glued-together boring bar according to the present invention, in perspective obliquely from above.

In FIG. 1 a boring bar 1 is generally shown comprising a shaft portion 2 and a bar head 3. The rear part of the shaft is introduced into a holder in a way known per se, whereafter the necessary clamping force is obtained by a screw joint or by a hydraulic bushing. The shaft portion may be formed in a number of different ways, depending on which properties are desired and is not an essential feature of the invention. On the bar head 3 is clamped a suitable cutting insert 4 formed of a hard material, such as cemented carbide. The cutting insert is fastened in its insert seat by a locking screw, a clamp or similar.

Generally, a very large amount of materials are possible both for forming both the shaft portion and the bar head, as long as they fulfil the requirements relating to strength and function, e.g., both may be produced of tool steel or spring steel, such as SS 2230. Further, in order to reduce the weight and increase the natural frequency, the bar head may also be made of a lighter material, such as aluminum or magnesium, or an alloy based on one or both of these two metals. For the same purposes, the shaft portion may also be made of a lighter material. Alternatively, the shaft portion may be made of a coal fibre reinforced synthetic material.

Figure 2:
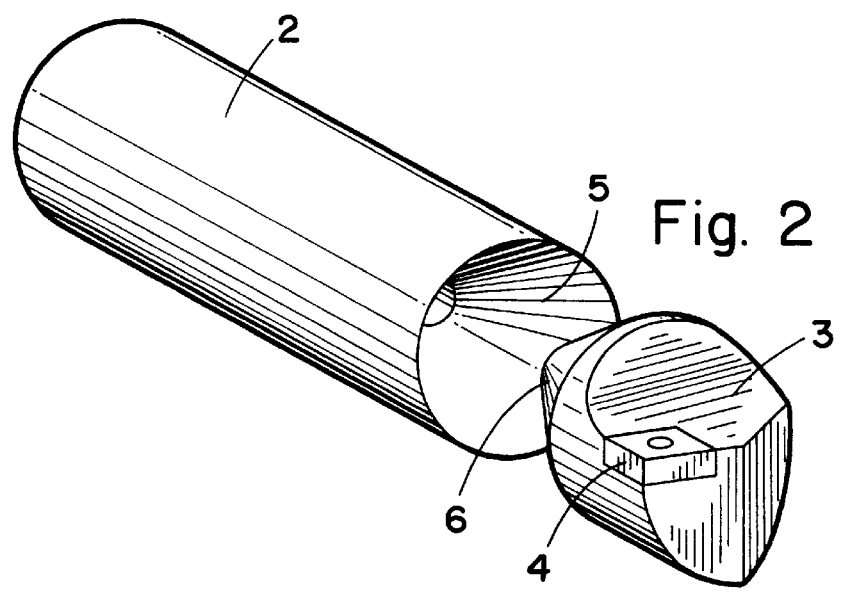
FIG. 2 shows the same boring bar as FIG. 1, but with two parts thereof being separated from each other.

In FIG. 2 the shaft portion and the bar head are separate from each other, whereby it may be seen how the shaft portion has a rearwardly narrowing wall forming a substantially conical recess 5 and the bar head a rearwardly narrowing wall forming substantially conical protrusion 6, the latter being provided to fit into the conical recess 5. According to the essential feature of the present invention, the mutually facing surfaces of the walls of the part 6 and the recess 5 are fixed to each other by an adhesive joint. Besides the fact that such an adhesive joint has a fully sufficient strength and is fast and simple to realize in practice, it has turned out to be pronouncedly vibration damping. The apex angle α of the adhesive joint is suitably between 2 and 50°, preferably between 5 and 30°. The joint length d is suitably between 10 and 200 mm, preferably between 25 and 120 mm.

Figure 3:
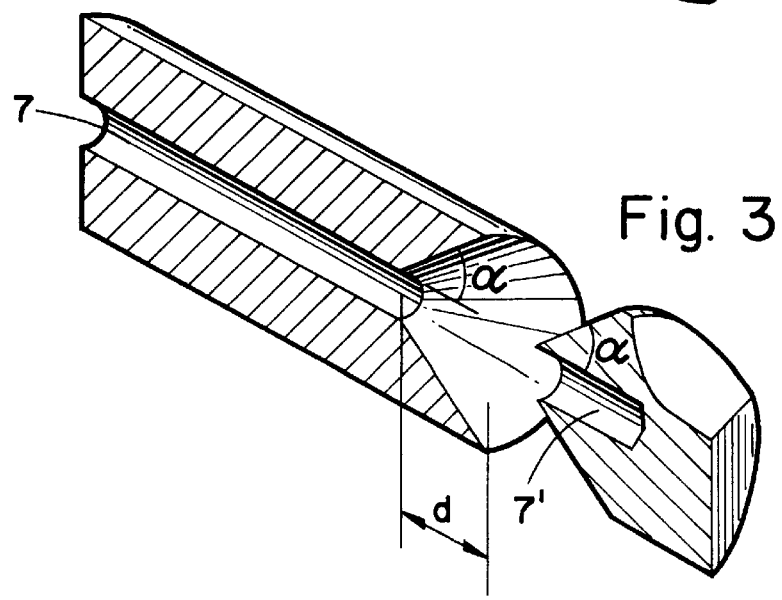
FIG. 3 shows a central axial cross-section of the demounted boring bar according to FIG. 2.

As may be seen in FIGS. 2 and 3, the shaft portion, and to some extent also the bar head, may be hollow, suitably in the form of a central boring 7 and 7', respectively. This also contributes to lowering the total weight of the bar, at the expense of a negligibly small weakening. The diameter of the cavity may either be substantially constant or vary in the axial direction. This makes it possible to alter the natural frequency and deflection of the bar in comparison with a solid bar. Thus, the diameter of the boring 7 may either increase or decrease in the direction of the bar head. Further, the central cavity 7, 7' may be used for transporting any possible cutting fluid to the proximity of the operative cutting point (not shown).

The conical adhesive joint according to FIGS. 1 to 3 constitutes a preferred embodiment, however not the sole one. Thus, FIGS. 4 and 5 illustrate another embodiment, according to which the outer and inner cones have been replaced by a wedge-like boundary surface. The wedge shape is suitably radially uniform and has an apex angle β which corresponds to the angle α, i.e. β is suitably between 4 and 100°, preferably between 10 and 60°. The joint length corresponds to d in FIG. 3. According to FIGS. 4 and 5, this boring bar is solid, but it may also be formed with a central cavity, in the same way as the one shown in FIGS. 1 to 3.

A plurality of adhesive types have been found suitable for the present invention. Thus, advantageously adhesive types like epoxy adhesive, acrylate adhesive, polyuretane adhesives, phenol/vinyl adhesive, nitril adhesive, adhesives of natural and/or chloroprene-rubber, phenol/nitril adhesive, acrylalte rubber adhesive, polyamide adhesive or polyester adhesive, and possibly also phenoxy adhesive. These may be of the one component or two-component type and may be used with or without thermal curing and a primer. Suitably, they are anaerobic. Examples of suitable types of epoxy adhesives are disclosed in DE-A-1 107 400, which is hereby incorporated by this reference. An example of a suitable acrylate adhesive is Araldit AV 118 (reg. trademark), by means of which a tear strength of at least 25 N/mm² after a hardening at 150° C. during 30 min is obtained. Another suitable adhesive is Loctite (reg. trademark). Moreover, the thickness of the adhesive joint may vary within relatively broad limits. With one and the same type of adhesive, a thicker adhesive joint gives an improved damping effect. On the other hand, the strength of the adhesive joint deteriorates when the adhesive joint is too thick. A suitable adhesive joint thickness for the conical parts 5 and 6 may be between 0.05 and 0.8 mm, preferably between 0.1 and 0.5 mm. Surprisingly, it has also been demonstrated that in principle, the adhesive joint becomes equally strong also when the joint surfaces are black-oxidized or "jetalized".

In order to obtain a further improved vibration damping effect, the shaft portion may be shaped in accordance with FIG. 6. Thus, the shaft may comprise an outer, tube- or sleeve-like part 9, which encloses a core 10 that is concentric with said part 9. This core may either consist of a massive (solid) bar or have a centrical boring 11. Between the sleeve part 9 and the core 10, there is a second adhesive joint 12, which functions in a vibration damping way. The thickness of this adhesive joint may suitably be between 0.05 and 1.5 mm and may consist of the above mentioned adhesive types, suitably such a one that has a larger toughness and a greater capability of taking up energy. The sleeve part and the core may very well consist of different materials.

Although several of the adhesive types may be used both for the bar head and the joint in the shaft portion according to FIG. 6, there are some differences. Thus, acrylate adhesives, epoxy adhesives and phenoxy adhesives are particularly useful for the joint to the bar head, while for an optimal damping, nitril rubber adhesives, acryl rubber adhesives, chloroprene rubber adhesives and natural rubber adhesives are suitable for the shaft portion. If one in first hand does not want to have a vibration damping bar, but a bar with as little deflection as possible, one can use a harder material and a stronger adhesive also in the shaft portion.

Comparative tests were performed between solid bars of 25 mm in diameter of spring steel, on one hand integrally in one sole piece and on the other hand with a conical adhesive joint according to the invention. The joint surfaces were in the form of cones with an angle α of 12°. The used adhesive type was Araldit AV 118 and the thickness of the adhesive joint was ≦0.2 mm. A considerably improved damping was obtained. Moreover, the useful life was extremely good: all bars resisted >2.10⁶ load cycles of 3.4 kN±0.34 kN in a fatigue testing machine. Furthermore, the adhesive joint can resist a maximal load of at least 6.0 kN at the cutting point, which is a considerably higher load degree than the one that arises at normal machining.

What is claimed is:

1. A boring bar comprising:

a shaft portion having a front end in which a forwardly open recess is disposed, the recess defined by a rearwardly narrowing first wall; and a bar head including a rearwardly extending projection disposed in the recess and including a second wall narrowing rearwardly in a complementary manner to the first wall;

the first and second walls being glued to one another by a layer of vibration dampening adhesive having a thickness in the range of 0.05 and 1.5 mm;

the bar head carrying a cutting edge structure arranged non-symmetrically to a longitudinal center axis of the shaft portion; wherein the first and second walls are of conical shape.

2. Boring bar according to claim 1, wherein the shaft portion comprises a substantially cylindrical core and a tubular part located coaxially outside said core, said core and said tubular part being joined together by an adhesive.

3. Boring bar according to claim 1, wherein the adhesive is one of: an epoxy adhesive, an acrylate adhesive, a polyurethane adhesive, a phenol/vinyl adhesive or a polyester adhesive, or chemically compatible mixtures of two or more of said adhesives.

4. Boring bar according to claim 1, wherein the bar head is made of a material comprising one of aluminum, magnesium or an alloy based on one or both of aluminum and magnesium.

\* \* \* \* \*